US006789101B2

(12) United States Patent
Clarke et al.

(10) Patent No.: US 6,789,101 B2
(45) Date of Patent: Sep. 7, 2004

(54) AUTOMATION SYSTEM USES RESOURCE MANAGER AND RESOURCE AGENTS TO AUTOMATICALLY START AND STOP PROGRAMS IN A COMPUTER NETWORK

(75) Inventors: Michael Clarke, Nedlands (AU); Juergen Schneider, Althengstett (DE); Walter Schueppen, Boeblingen (DE); Alexander Terekhov, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 09/731,502

(22) Filed: Dec. 7, 2000

(65) Prior Publication Data

US 2001/0018710 A1 Aug. 30, 2001

(30) Foreign Application Priority Data

Dec. 8, 1999 (DE) .......................................... 199 59 181

(51) Int. Cl.[7] .............................................. G06F 15/16
(52) U.S. Cl. ...................................... 709/202; 709/223
(58) Field of Search ................................ 709/202, 223, 709/220; 718/101, 107; 379/406.1; 714/4

(56) References Cited

U.S. PATENT DOCUMENTS

| 5,095,421 | A | * | 3/1992 | Freund | 718/101 |
| 6,195,678 | B1 | * | 2/2001 | Komuro | 709/202 |
| 6,243,825 | B1 | * | 6/2001 | Gamache et al. | 714/4 |
| 6,304,655 | B1 | * | 10/2001 | Meek | 379/406.01 |
| 6,385,638 | B1 | * | 5/2002 | Baker-Harvey | 718/107 |
| 2001/0003831 | A1 | * | 6/2001 | Boland | 709/226 |

* cited by examiner

Primary Examiner—Le Hien Luu
(74) Attorney, Agent, or Firm—William A. Kinnaman, Jr., Esq.; Blanche E. Schiller, Esq.; Heslin Rothenberg Farley & Mesiti P.C.

(57) ABSTRACT

The present invention controls the automation process in a computer network system. An Abstract Resource Model is introduced in which the model results in the automation being divided into two: an automation execution component and an automation decision-making component. The automation execution component controls how programs or resources are run within a specific environment, and the automation decision making component controls when a program or resource is run on an abstract decision-making level. In the Abstract Resource Model, the operator needs no specific knowledge as to which programs or program components belong to an overall application, or which programs or program components need to be started in which order.

19 Claims, 7 Drawing Sheets

AUTOMATION SYSTEM USES RESOURCE MANAGER AND RESOURCE AGENTS TO AUTOMATICALLY START AND STOP PROGRAMS IN A COMPUTER NETWORK

PRIOR FOREIGN APPLICATION

This application claims priority from German patent application number 19959181.4, filed Dec. 8, 1999, which is hereby incorporated herein by reference in its entirety.

TECHNICAL FIELD

The invention describes a system and method for automation of a computer network, in particular for automatic starting and stopping of resources in the computer network taking account of their start dependencies.

BACKGROUND ART

The interaction between various IT resources in connection with non-determinable requests and events forces the operators of computer centers to monitor, and where necessary correct, the behavior of the said systems. This activity is usually termed Operations Management. Automation as a subsidiary discipline concerns itself with the task of simplifying Operations Management.

In this, an attempt is made to analyze autonomously occurring events and to respond in accordance with an instruction. This instruction is customer-specific, since automation is not able to make the necessary decisions a priori.

A key aspect of automation is that the availability and delivery of IT resources depends on certain states of other IT resources. A specific computer center service (=an application) cannot be made available before all the necessary IT resources for it have been started. An application of this kind typically comprises several programs on different computers. These programs require data which are stored on various storage media. Very often it is also necessary to provide a comprehensive network topology which permits the individual components to communicate both internally and externally.

A further key aspect of automation relates to the fact that IT resources are required by several different applications simultaneously (shared resources). For example, a disk will typically store data for more than one application. Database software can be used for payroll accounting as well as for the product planning system (PPS), and networks are not limited to single applications.

The management of these structures with the goal of delivering and maintaining applications for a specific period of time (service window) is fundamentally supported by automation functions.

The fact that nowadays applications are distributed across several different systems and computers have been interconnected to form complex structures has made automation substantially more difficult.

In a large S/390 Sysplex network, for example, 5,000 programs can be launched in parallel. Application programs are distributed in several instances across computers in the Sysplex network. The workload is distributed across several computers, resulting in a higher throughput, and in the event of a total failure of a computer applications can continue running at reduced capacity on the remaining computers.

The dependencies between the individual IT resources are not dealt with adequately at present. For example, resources can only be started if other resources are already active, or should only be started when another resource has been stopped. The dependencies also apply to the stopping of IT resources.

Likewise, a resource could be started but could not fully perform its service without a specific resource being active/inactive.

The basic object of automation is to deliver or to terminate an application. When this object is fulfilled, automation attempts to maintain the attained state until a new goal is transmitted.

A change in goal may have many causes:
  The operator wants to change.
  A service window has expired or begun (driven by a calendar).
  The system wants applications to be relocated or additional instances to be created as a result of capacity bottlenecks.

Such goals may be mutually contradictory and have differing levels of importance. At present automation functions barely respond to the demands of that rule. Each automation order is executed unconditionally, with no account taken of the preceding activities and without truly understanding why a resource is in its current state. As a result, it may occur that the operator stops an IT resource without knowing that the resource is still needed by another application.

Maintenance work is being carried out on a resource, for example. The allotted time for the work is not sufficient. In this case especially, the beginning of a service window must not result in the resource starting.

The automation described above is at present restricted to a single computer. Consequently, only dependencies between IT resources belonging to that computer can be defined. Typically they are programs which can be run on the computer on which the automation software is also active. Although today a large number of resources of a company are accessible over networks on different computers, a local automation software per se cannot centrally automate all remote IT resources because the data exchange to monitor an automation process could overload the network (message traffic);
  failure of the centralized automation software would result in the total failure of an entire computer network;
  the number of resources needing to be automated simultaneously could result in bottlenecks in the automation software itself.

The limitation in force to date has meant that distributed applications could in no way be automated in their entirety. Rather, the automation software itself must attempt, as a client/server topology, to run processes directly on each computer locally and only escalate to a remote next highest instance when required.

This is illustrated by the following example (see FIG. 1), wherein a Web Server application requires the following three start-dependent programs:

1. Network (for example TCP/IP)
2. Database software (for example IBM DB2)
3. Web Browser software For capacity reasons, each program is started on a different computer. However, the Web Browser cannot be started until TCP/IP and DB2 are both active. This behavior is dependent on the implementation of the Web Browser software. Ideally, this software would simply wait until its two partners are active. But this is not always the case: it can occur that a Web Server which has started too early simply terminates again.

Starting of this application is not fully automatable at present. The process must run as follows:

1. Start TCP/IP on system 1 and DB2 on system 3. This can be done by the automation functions of the respective systems.
2. Monitor both processes until both are active. Automatic launch of the Web Browser cannot be handled because of the limitation described here.
3. Start Web Browser.

In order to launch the overall application three orders are actually required to be entered by the operator. Experienced operators launch the Web Browser first. Assuming the automation is now capable of launching the start-dependent resources (TCP/IP and DB2) first, the overall application could be activated in this way. That works well until there are applications in which there are resources with no start relationships. Of course this component, too, can be entered somewhere in the start dependencies, but with the result that start processes are serialized.

Resources serve several applications (shared resources) and comprise several components (resource components) which can run on different computers. In the OS/390 Sysplex these components can run multiply on different computers (resource instances). This provides a better throughput, and a greater availability in the event of complete computer failures.

The automation can meet the preconditions before the desired resource is handled.

This solution does not support the following valid situations:

Resources in a start relationship do not necessarily have to be in a stop relationship in the reverse sequence. Typically, resources are more often in a start relationship than a stop relationship. With the present-day concept, when an application is terminated components are unnecessarily serialized, even though the computer capacities would permit more parallelism. The overall process takes longer.

Starting a resource should also trigger termination of another resource as an action, or conversely stopping a resource requires activation of a second resource. In computer systems in which two applications are to be only active exclusively, this concept can be utilized to automate the transition from one application to others (configuration switch).

Automation delivers value by taking over operations tasks and decisions to prevent the operator from causing damage as a result of incorrect decision-making. This can only be limited to deterministic events, of course. More complicated matters remain left to the discretion of a human operator. Thus two decision-making instances are produced which can easily come to different results. Present-day automation gives the operator every freedom, it is order-driven and attempts to implement the new order input more or less unconditionally. It is difficult for the operator to protect against incorrect decision-making.

When new orders are given no analysis is made of why a current state has been attained and whether the reason for the said state (goal) was not more important that the change now required.

If the operator is right, however, it is not possible automatically to restore the overwritten original state (with the associated reasoning). The operator himself must know what the old state was, and why it was set.

SUMMARY OF THE INVENTION

It is therefore the object of the present invention to deliver an improved system and method for automation of programs on distributed computers which avoids the aforementioned disadvantages.

This object is fulfilled by the characteristics in the independent claims. Further advantageous embodiments of the invention are recorded in the subclaims.

A major advantage of the present invention is based on the introduction of an Abstract Resource Model. This model results in the automation being divided into two: an automation execution component (Automation Agent or Resource Agent); and an automation decision-making component (Automation Manager or Resource Manager).

The Resource Agent controls how programs or resources are run within a specific environment. For this, the Resource Agent has at its disposal predefined routines to start, stop or monitor a program. The Resource Agent is preferentially installed on the computer on which the program or resource is installed.

The Resource Manager controls when a program or resource is run on an abstract decision-making level. The Resource Manager stores the dependencies of the programs or resources for starting or stopping. The programs are represented by a name. The automation decision-making component is non-system-dependent, and so can be installed on any computer in the automation system. An additional Resource Manager is preferentially installed on a second computer in case the first Resource Manager fails. The advantage of the Abstract Resource Model lies in the fact that the operator needs no specific knowledge as to which programs or program components belong to an overall application, or which programs or program components need to be started in which order.

Those programs or program components which necessitate reciprocal running can preferentially be assembled in a base group and are notified to the operator via the user interface under a base group name.

A further advantage of this invention lies in the fact that new programs only need to be incorporated as abstract resources in the Resource Manager. Only the specific run routines for the new program need to be implemented additionally in the Resource Agent.

A further advantage of the present invention is that the Resource Manager is based on a multi-relationship graph in which all the resources and their dependencies are mapped in a graph structure. Lastly, a further advantage of the present invention lies in the fact that a priority control is introduced for different requests.

BRIEF DESCRIPTION OF THE DRAWINGS

The present invention is described in more detail on the basis of preferred embodiments of the invention in conjunction with drawings, wherein.

BEST MODE FOR CARRYING OUT THE INVENTION

Figure 1:
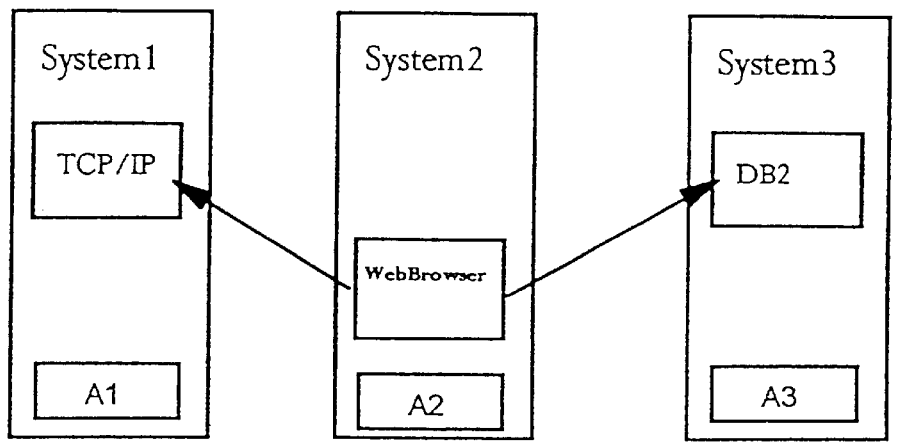
FIG. 1 shows a distributed computer system comprising three computers each with one program and their start dependencies.

A key aspect of this invention is the introduction of an Abstract Resource Management Model. As a general principle, each abstract resource only becomes controllable by means of a so-called Agent.

The automation in accordance with the invention is then divided into two parts:

1. Automation execution (Resource Agent): This part concerns the "HOW". How are specific programs or IT resources started, stopped or monitored. Such functions are dependent on the type of resource, requiring a very precise knowledge of the resource in question. Automation provides specialized routines for such types. For reasons of throughput and accessibility, these routines run as close as possible to the automated resource itself. In the case of an application program the routines run on the same computer.

2. Automation decision-making (Resource Manager): This part concerns the "WHEN"—when specific automation routines described above have to run. It is the decision-making instance. But decisions are disassociated from the "type of resource". Whether the resource is a hardware disk or an application program is not relevant at this decision-making level. Real resources are modeled here as abstract resources. If the decision-making process can be detached from the resource type, the location where the decision is made is not dependent on the "real resource". It can be made anywhere, and is not bound to a system or computer.

The advantages of this split are:

1. The automation itself can be expanded as an Agent/Manager application in a computer network.
2. New IT resources can be immediately incorporated as abstract resources into the decision-making instance. Only the specific Resource Agent need be implemented.
3. Applications as a collection of real resources are themselves included as abstract resources. In this way relationships can be created between applications.

In implementation of the management of abstract resources (the Resource Manager) the concepts of the Related Individual Based Model Processor described in computer science were applied.

Such models are typically used to simulate complex biological, ecological or economic situations.

An abstract resource is merely a name. By entering that name the resource in question can be addressed as an object. Each abstract resource represents a real resource or a specific behavior (the "HOW") by the reference of an Agent. The "HOW" is irrelevant in this instance, however.

The resource has its own memory as an abstract object (Resource Variable).

This memory is used to store 1. different resource states
2. results of a computation (correlation evaluations).

These variables control the respective decision-making processes.

The resource variables likewise have names by which they are addressed in the rule definitions.

A further aspect of the present invention is based on the use of a multi-relationship graph. A resource can have multiple relationships to other resources.

Relationships are the edges and resources are the nodes in a multi-relationship graph. The edges likewise have names. A set of rules (Logic Deck) describes the semantics of the respective edges.

Each resource can have any number of edges pointing away from the said resource to other resources (supporting or dependent resource or start-dependent resource) and vice versa.

Rules for Individual Resources (Correlation)

The resource variables described above can be placed in relation to each other. The time when a resource is "ready to start" is ascertained. It is a WHEN . . . THEN/ELSE syntax. The WHEN clause permits a Boolean expression of the resource variables. The THEN component is executed if the expression proves to be TRUE; if it proves FALSE the ELSE branch is selected. The automation decisions are made with this technique. A decision may be that this resource can now be started. The associated Resource Agent receives the relevant order. Another action in the THEN/ELSE part could, however, also merely be setting of a further resource variable. Likewise, the result of a correlation may again serve as the input for a next correlation.

Resource variables can be modified from the outside (operator or Agents). If a modified variable is then part of a WHEN expression, the evaluation is re-triggered. In this it should be noted that it is only triggered when the value of the variable changes.

Rules Relating to Several Resources in a Specific Relationship (Relationship Correlation)

In this, resource variables of several resources are now incorporated into a correlation. Two concepts are linked:

1. The rules in accordance with the WHEN . . . THEN/ELSE technique as a trigger for decisions.
2. This rule needs to cover a whole series of resources which are in a defined relationship. It should be noted that this rule is automatically applied when a new resource is dynamically introduced into this relationship complex. Of course, the rule loses its effect when a resource withdraws from a relationship string once again.

All rules necessary for automation are set out in a Logic Deck and loaded when this program is started. By loading different Logic Decks, the overall behavior of the system in its entirety can be changed without having to modify the abstract resources and their relationships.

Each abstract resource is preferentially assigned a Resource Agent. Resources without Agents could not be automated, because the active component is missing. An Agent may of course feel responsible for several resources.

Decisions are made by triggering the correlations and relationship correlations described above. One possible action resulting from such computations is the transmission of an order to the Resource Agent. The Resource Manager and Resource Agent understand the protocol required for this. This protocol is preferentially the same for all Resource Agents. The Manager merely sends the order to different Agent addresses. The Agent can translate an abstract order into the correct resource-specific actions. If the status of a resource is thereby changed, important transitions are reported back by the Agent to the Manager (Status Feed). This may again trigger correlations or relationship correlations.

Lastly, a further aspect of the present invention is the priority control for requests.

Requests represent wishes, transmitted from an external source to the automation function, to set resources to a specific state. External sources are typically the operator, the sequence control system itself (calendar, scheduler, etc.) or the system itself. Requests are comparable with a status feed, but have a completely different meaning and are also processed differently. A request formulates the desire to change specific goals of a resource. By this, decisions made in the past may be overwritten. The automation must not unconditionally execute such requests.

This has the following consequences:

1. Requests have differing levels of importance. Each new request is classified according to its importance and only the "winning" request is actually processed further.
2. Requests remain in the processing queue until they are explicitly deleted. This also applies in particular to the "winning" request, even though processing of it was long since completed.

The desire to change the goal of a specific resource may also involve a change to the "supporting" resources and their "supporting" resources, and so on. Basically, this request is then applicable to all other resources concerned. The request is propagated along the edges to all resources (nodes) as far as the end node. In the process, the original request may also be transformed into a new request.

FIG. 1 shows a computer network system comprising computers 1, 2 and 3.

Computer 1 holds the TCP/IP application, computer 2 the Web Browser application, and computer 3 the DB2 application. The arrows originating from the Web Browser indicate that the Web Browser can only be started when the TCP/IP application and the DB2 application are active (started). A1, A2 and A3 are the respective programs for starting the applications. According to the state of the art, they must be started individually by the operator. The operator must know the start dependencies for the program in question.

Figure 2:
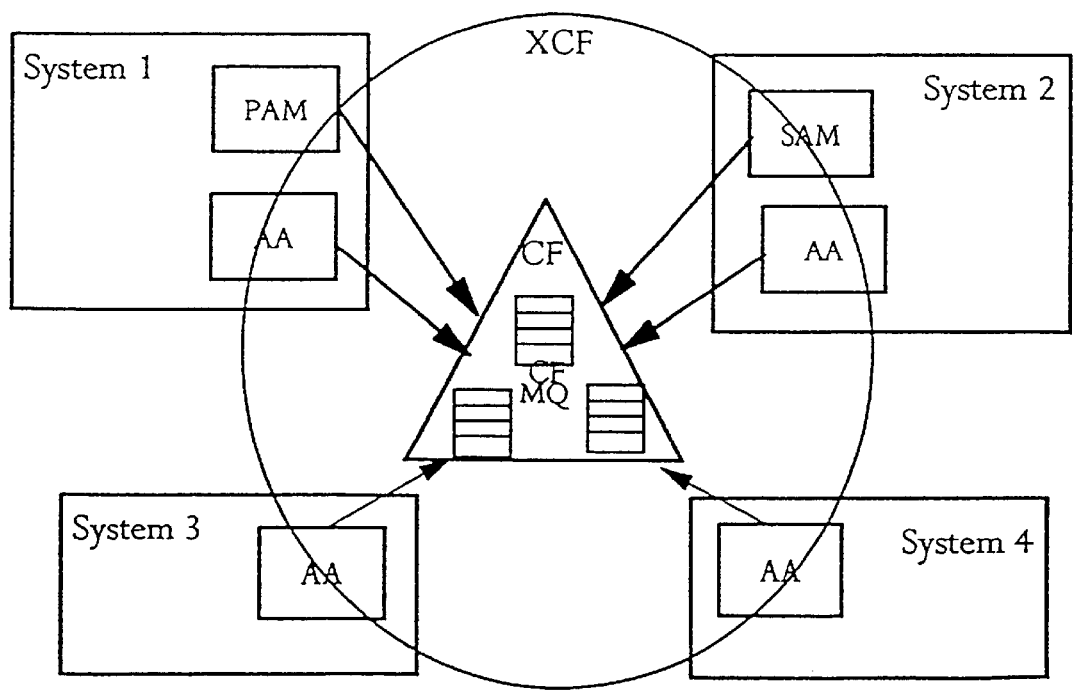
FIG. 2 shows the automation system in accordance with the invention.

FIG. 2 describes a preferred embodiment of the automation system in accordance with the invention for a computer network system comprising the systems 1, 2 and 3, which are interconnected over a network. The individual components of the automation system are as follows:

CF: e.g. IBM S/390 computer Coupling Facility, typically used to exchange data between the individual OS/390 applications on the Sysplex computers (data sharing).

XCF: e.g. IBM OS/390 Cross System Communication Facility. Enables the active Resource Manager to detect an error situation in an automation client and respond accordingly.

MQ: Communication between the Resource Manager and the Resource Agent is mapped by way of Message Queues. As a result, all queries and decisions can be reset to a valid status if required (failure of the active PAM). This is necessary to enable a standby instance to restart.

System 1 . . . 3: Sysplex network computer system.

AA: The Resource Agent, the automation execution instance responsible for starting, stopping and monitoring the local resources. This instance essentially follows orders of the automation server and knows the resource-specific modes of behavior. This function is required on every computer in the Sysplex.

PAM: The currently active (primary) Resource Manager, makes the automation decisions at an abstract level. This function is required once per OS/390 and is located on a computer in the Sysplex.

SAM: A backup Resource Manager in wait mode, in case the PAM fails. This backup Manager is located on another computer in the Sysplex.

Communication between the PAM and the AA is by writing and reading messages to and from a specific queue. Access to the said queue is possible for all instances within a OS/390 Sysplex network, since the data are held on a S/390 Coupling Facility.

Figure 3A:
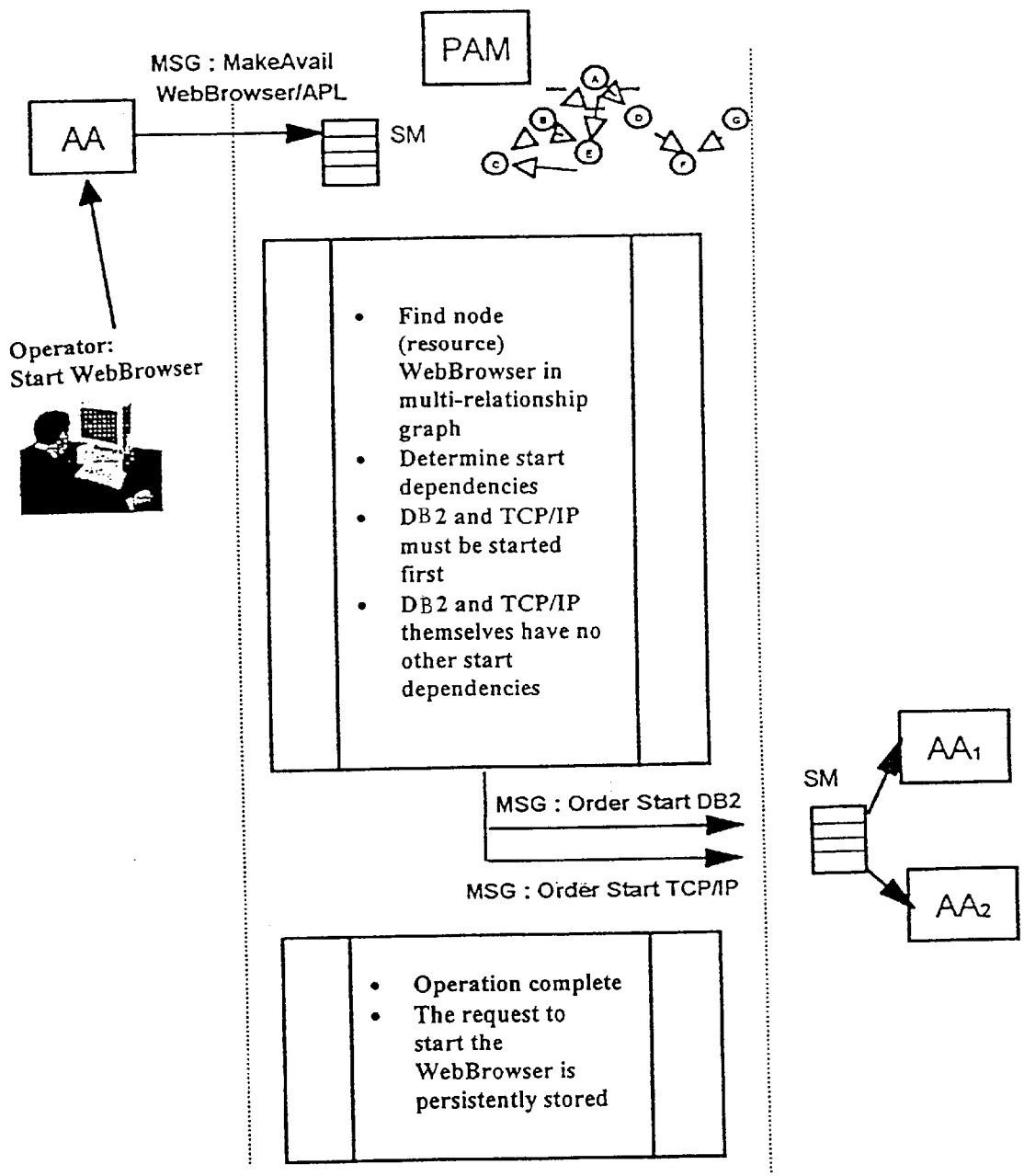
FIGS. 3A–B show the automation method in accordance with the invention.
Figure 3B:
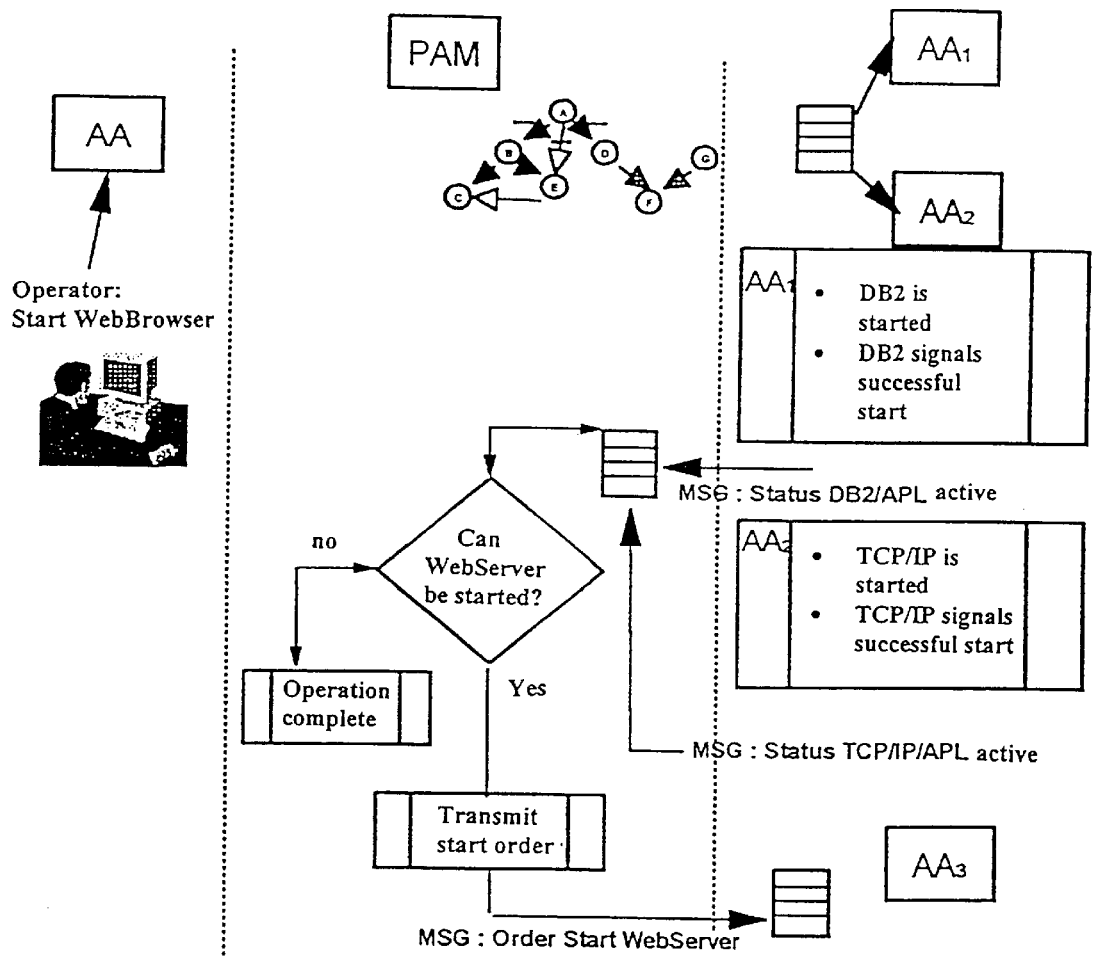

FIGS. 3A–B sets out the automation method in accordance with the invention for an automation system as shown in FIG. 2.

The Web Server application as shown in FIG. 1 is to be launched. The operator transmits to the automation function the order to start the resource Web Browser. The Resource Agent AA has a dual function in this case: It is responsible for receiving the order and for starting a resource.

1. The operator transmits to the Resource Agent AA the request to start the Web Browser.
2. The Resource Agent AA translates the request into a formatted message which is stored in a queue of the shared memory of the CF.
3. The PAM is notified of receipt of the message by way of the Message Queuing Protocol. The PAM is installed on any system in the computer network. The start and stop dependencies (configuration data) for each resource of the computer network are stored in a multi-relationship graph structure in a non-volatile memory of the system, and are held in the main memory during the runtime. The graph structure contains no information concerning the current and desired state of a resource. This information is generated when the computer network is booted up and transmitted to the PAM. The information is additionally stored in a non-volatile memory and is updated as necessary by the PAM. This permits problem-free restarting if the PAM crashes.
4. The PAM retrieves the message from the queue and interprets the request contained in the message.
5. The name of the resource permits the input node in the graph to be determined.

In the example shown in FIG. 1 it is the Web Browser.

6. The PAM determines all start dependencies for the Web Browser based on the node.

In the example shown in FIG. 1 it is the TCP/IP and DB2.

7. The current state of the supporting resources (TCP/IP, DB2) is determined.
8. If the supporting resources are not active, the following steps are taken:
    a) The supporting resources TCP/IP and DB2 are determined; if none present, as in FIG. 1
    b) TCP/IP and DB2 are started by a decision by the PAM.
9. The PAM generates a start order for the TCP/IP and DB2 and sends the order to the Agents AA1 and AA2 assigned to the resource. Each node also contains the address information of its assigned Agent. This order is again placed as a message in a queue of the shared memory.
10. The Agents AA1 and AA2 are notified of receipt of the message by way of the Message Queuing Protocol.
11. Agents AA1 and AA2 send the message that both resources are active to the shared memory.
12. The PAM retrieves the message from the resources from the shared memory, ascertains that the start conditions for the Web Browser are met, and places a start request in the shared memory.

13. Agent AA3 is notified, retrieves the start request and starts the Web Browser.
14. Agent AA3 sends the message that the Web Browser is active to the shared memory. The PAM retrieves the message from the shared memory and updates the status information for the Web Browser.

Figure 4A:
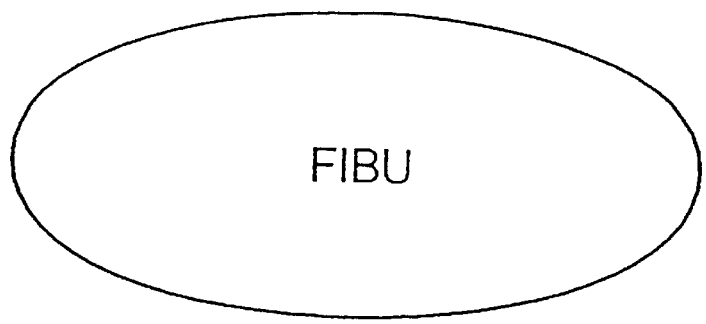
FIGS. 4A–E show the user interface in accordance with the invention from the viewpoint of the system administration, based on the example of the financial accounting system FIBU.
Figure 4B:
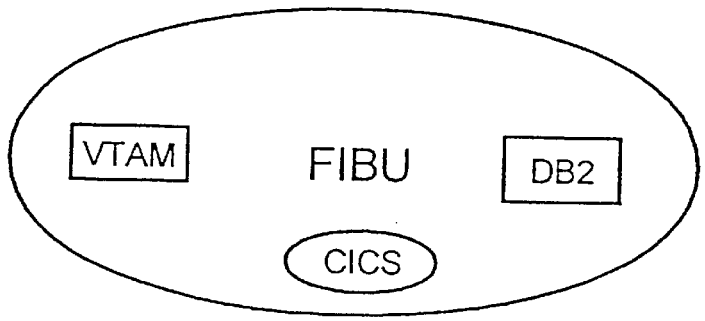
Figure 4C:
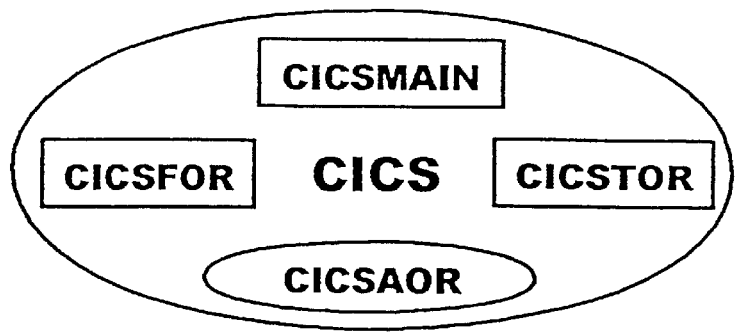
Figure 4D:
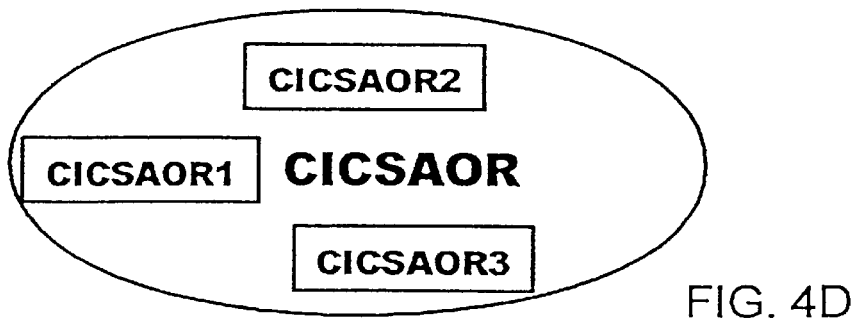
Figure 4E:
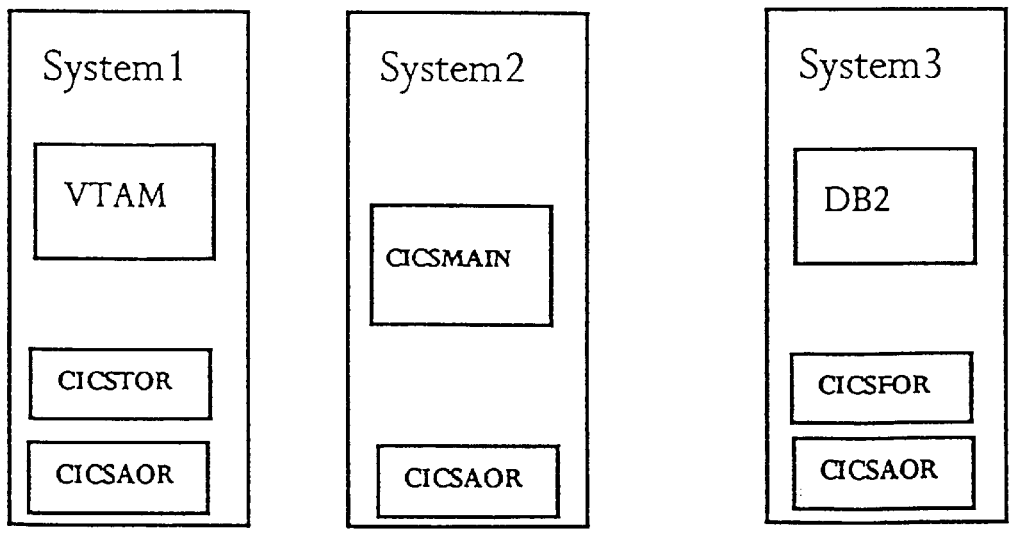

FIG. 4A shows the user interface in accordance with the invention from the viewpoint of the system administration, based on the example of the financial accounting system FIBU. The operator can start, stop or monitor the FIBU resource. However, the FIBU resource also includes several other resources. FIBU is in this case a base group of programs, i.e. the programs belonging to the base group must all be started for the FIBU to be activated. If no error situations occur during starting or stopping of FIBU, the operator also needs no additional information about these other resources. That is why they are also not normally displayed on the user interface. When FIBU starts they are automatically started along with it. However, in the event of an error the operator can query which resources belong to FIBU as start dependencies. In this case the operator is shown the programs belonging to the FIBU base group. FIG. 4B shows a user interface with these programs. To enable FIBU to start, VTAM, DB2 and CICS must be active. FIG. 4C shows that other resources belong to CICS as start dependencies. These are the programs CICSFOR, CICSMAIN, CICSTOR and CICSAOR. CICS thus forms a further base group. However, in the event of an error message the operator can check which programs belong to CICS. FIG. 4D shows that other resources belong to CICSAOR. In contrast to FIG. 4C, however, CICSAOR forms a server group; that is to say, in it the programs CICSAOR1, CICSAOR2 and CICSAOR3 are replicas of the CICSAOR program. FIG. 4E shows a concrete application, wherein the CICSAOR program is installed on the systems 1, 2 and 3.

Figure 5:
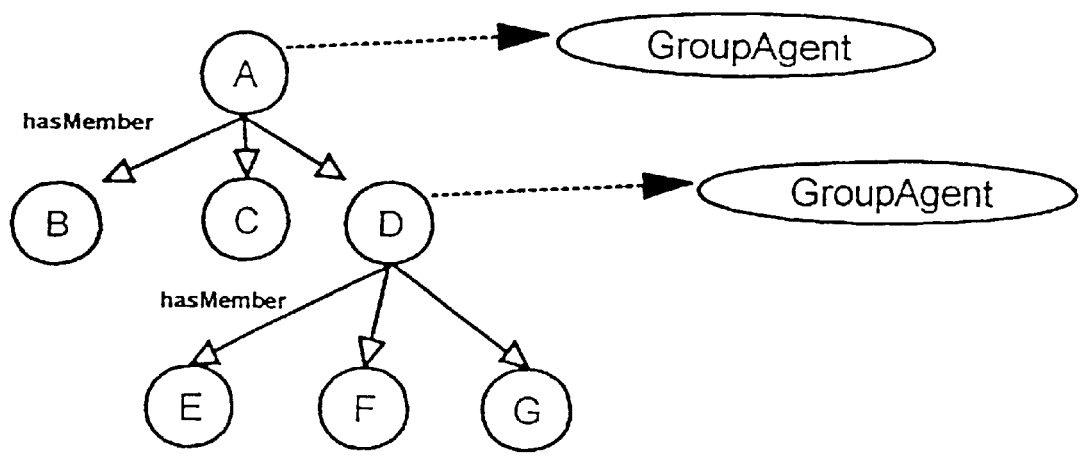
FIG. 5 shows the principle of formation of base groups in accordance with the invention, based on the example of the financial accounting system FIBU.

FIG. 5 shows formation of a base group in accordance with the present invention, based on the example of the multiple graph. In the example given A and D are base groups.

Figure 6A:
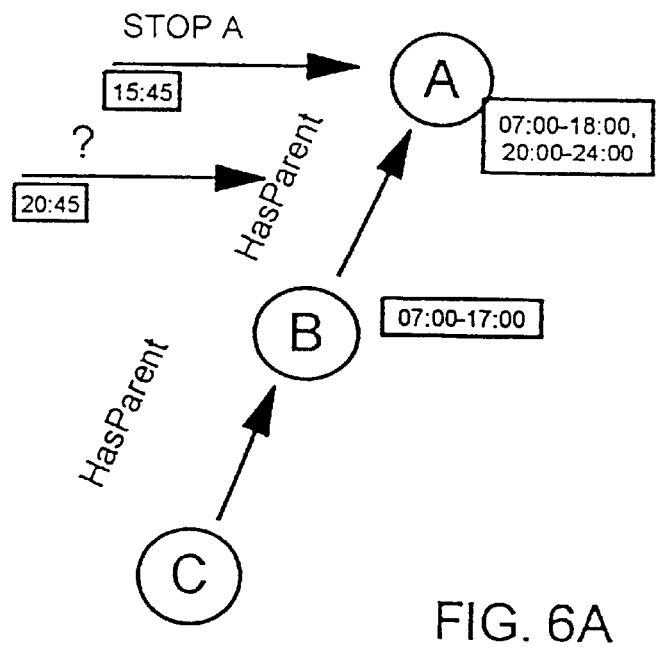
FIGS. 6A–C show the principle of priority control in accordance with the invention.

FIG. 6A shows the handling of requests according to the old method.
Resource A is to be active in the time between 07:00–18:00 and 20:00 and 24:00.
Resource B is to be active in the time between 07:00–17:00.
At 15:45 the operator decides to stop resource A to carry out maintenance work.
Over schedule, the maintenance work is not completed until 20:45 hours. After the service window resource A should have been started automatically by the automation software. However, since the maintenance work is going on until 20:45, the resource must not be started beforehand.
On completion of the maintenance work the operator must know that the resource is in a new service window and needs to be restarted.

Figure 6B:
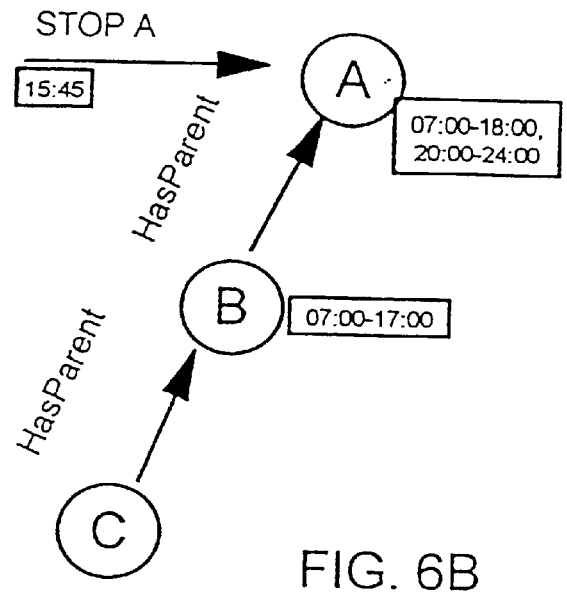

FIG. 6B shows the priority control in accordance with the invention. In the example given, the following priorities are set:
Low Operator Resource A High Schedule
Resource B High Schedule The operator decides at 15:45 to stop resource A. The Low Operator/High Schedule priorities apply. In order to stop resource A, resources B and C must be stopped first.

C can be stopped and is stopped. B cannot be stopped because it is open in the High Schedule window. Consequently, A remains active until B is stopped. This occurs at 17:00.

Figure 6C:
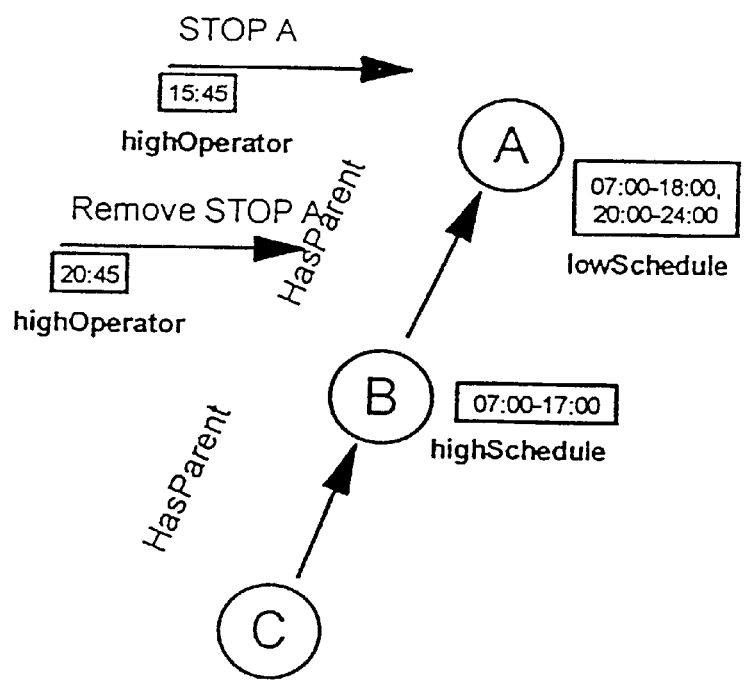

FIG. 6C shows a further example of the present priority control:
High Operator

Resource A Low Schedule
Resource B High Schedule

The operator decides at 15:45 to stop resource A in order to carry out essential maintenance work.
It is important to stop A, even if other resources are also affected. The High Operator higher than High Schedule priority applies. A, B and C are stopped.
At 20:45 A can be restarted. Now the entire structure must be set to the status applicable at that time. To that end, the stop request is removed. A is started and B and C remain stopped according to the schedule.

Figure 7:
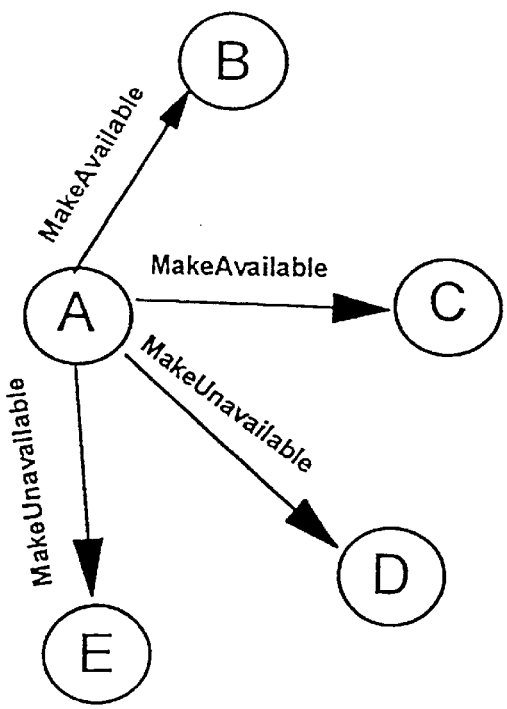
FIG. 7 shows the principle of the multi-relationship graph in accordance with the invention.

FIG. 7 shows the multi-graph structure in accordance with the invention. The resource A, as a dependent resource, is linked to resources B, C, D and E (supporting resources). There are differing relationships for the action which is executed against A:
MakeAvailable (Start A)
MakeUnavailable (Stop A)
Which states the "supporting" resources must have first:

Available (active and operational)
Unavailable (inactive)
Available or Starting (active or on the way to being active)

Whether the automation is to actively bring about the desired state of the "supporting" resources:

Condition=active (yes)
Condition=passive (no)

The present invention controls the automation process in a computer network system. The major advantage of the present invention is based on the introduction of an Abstract Resource Model. This model results in the automation being divided into two: an automation execution component (Automation Agent or Resource Agent); and an automation decision-making component (Automation Manager or Resource Manager). The automation execution component controls how programs or resources are run within a specific environment. For this, the automation execution component has at its disposal predefined routines to start, stop or monitor a program. The automation execution component is preferentially installed on the computer on which the program or resource is installed. The automation decision-making component controls when a program or resource is run on an abstract decision-making level. The automation decision-making component stores the dependencies of the programs or resources for starting or stopping. The programs are represented by a name. The automation decision-making component is non-system-dependent, and so can be installed on any computer in the automation system. An additional automation decision-making component is preferentially installed on a second computer in case the first automation decision-making component fails. The advantage of the Abstract Resource Model lies in the fact that the operator needs no specific knowledge as to which programs or program components belong to an overall application, or which programs or program components need to be started in which order.

Those programs or program components which necessitate reciprocal running can preferentially be assembled in a base group and are notified to the operator via the user interface under a base group name.

A further advantage of this invention lies in the fact that new programs only need to be incorporated as abstract resources in the automation decision-making component. Only the specific run routines for the new program need to be implemented additionally in the automation decision-making component.

A further advantage of the present invention is that the automation decision-making component is based on a multi-relationship graph in which all the resources and their dependencies are mapped in a graph structure. Lastly, a further advantage of the present invention lies in the fact that a priority control is introduced for different requests.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. System comprising at least:
    a) two computers including one or more identical or different programs and/or one or more input/output facilities (resources) and/or data carriers;
    b) a communication facility for exchange of information between the individual resources;
    c) an abstract Resource Manager installed in a non-volatile memory on one of the computers, at least comprising:
        aa) a component to register the resources of a computer;
        bb) a component to display the start and stop dependencies of the resources by means of a non-resource-dependent Logic Deck;
        cc) a component to access desired status information of a resource;
        dd) a component to update the status information of the resources; and
        ee) an interface component to activate the Resource Agent to start and stop a resource;
    d) a Resource Agent to execute the resource-specific start and stop orders, wherein the Resource Agent is installable on any computer in the computer network; and
    e) a monitoring and selection facility to start and stop a resource.

2. System in accordance with claim 1, comprising:
    f) a further abstract backup Resource Manager such as c), installed on a further computer.

3. System in accordance with claim 1, wherein the component to update the status information of a resource has access to a volatile and a non-volatile memory, wherein both memories are updated by the Resource Manager after every change.

4. System in accordance with claim 1, wherein the communication component comprises at least a computer coupling facility and a data line from the computer to the coupling facility via which the communication between the computers is routed.

5. System in accordance with claim 1, further comprising: a facility to detect errors on a computer.

6. System in accordance with claim 1, wherein the non-resource-dependent Logic Deck of component bb) has a multi-graph structure.

7. System in accordance with claim 6, wherein the multi-graph structure comprises nodes and edges, wherein the nodes represent resources and the edges represent the relationships between the nodes (resources).

8. System in accordance with claim 7, wherein the non-resource-dependent Logic Deck is held in When-Then-Else syntax.

9. System in accordance with claim 1, further comprising a component to prioritize requests according to their importance.

10. System in accordance with claim 9, wherein the importance is definable for starting and stopping a resource by the monitoring and selection facility.

11. System in accordance with claim 1, wherein the Resource Manager and the Resource Agent are computer program products which are installed in the non-volatile memory of a computer and are loadable during the runtime into the volatile memory of the computer.

12. System in accordance with claim 1, wherein the selection and monitoring facility contains at least the following components:
    a) a menu interface for starting and stopping programs;
    b) a component to display and activate linked programs under one resource name on the menu interface; and
    c) an interface component to a Resource Agent or the Resource Manager.

13. Method for automatic starting of a resource using a system in accordance with claim 1, comprising:
    initiation of a resource start;
    transmission of a start request to the memory of the computer coupling facility;
    retrieval of the request from the memory of the computer coupling facility by the Resource Manager;
    determination of the start dependencies for the respective resource based on the multi-graph structure;
    determination of the current state of the start-dependent resources;
    transmission of a start request to the memory of the computer coupling facility to start the start-dependent resources if the start-dependent resources are not active;
    retrieval of the request to start the start-dependent resource from the memory of the computer coupling facility by the assigned Resource Agent;
    starting of the start-dependent resource by the assigned Resource Agent;
    notification of the active state of the resource by the assigned Resource Agent to the Resource Manager;

updating of the status information for the start-dependent resources by the Resource Manager;

starting of the resource by the assigned Resource Agent if all start conditions are met; and updating of the status information for the resource by the Resource Manager.

14. Automation system to start and stop programs in a computer network, wherein the computers communicate with each other over a computer coupling facility, at least including the following components:

a) a Resource Manager installed in a non-volatile memory on one of the computers, at least comprising:
  aa) a component to register the resources of a computer;
  bb) a component to display the start and stop dependencies of the resources by means of a non-resource-dependent Logic Deck;
  cc) a component to access desired status information of a resource;
  dd) a component to update the status information of the resources; and
  ee) an interface component to activate the Resource Agent to start and stop a resource; and b) a Resource Agent for each individual resource to execute the resource-specific start and stop orders, wherein the Resource Agent is installable on any computer.

15. Method for automatic starting of a resource comprising:

initiation of a resource start;

transmission of a start request to a memory of a computer coupling facility;

retrieval of the request from the memory of the computer coupling facility by a Resource Manager;

determination of start dependencies for the respective resource based on a multi-graph structure;

determination of a current state of the start-dependent resources;

transmission of a start request to the memory of the computer coupling facility to start the start-dependent resources if the start-dependent resources are not active;

retrieval of the request to start the start-dependent resource from the memory of the computer coupling facility by an assigned Resource Agent;

starting of the start-dependent resource by the assigned Resource Agent;

notification of an active state of the resource by the assigned Resource Agent to the Resource Manager;

updating of the status information for the start-dependent resources by the Resource Manager starting of the resource by the assigned Resource Agent if all start conditions are met; and updating of the status information for the resource by the Resource Manager.

16. Method in accordance with claim 15, further comprising:

no starting of the resource or the start-dependent resource by the assigned Resource Agent if the following conditions are met:
  a) there is at least one other request with a different goal for the resource or start-dependent resource; and
  b) the other request has a higher priority.

17. Method in accordance with claim 16, wherein the original request is stored and reactivated in the event of failure of the request with the higher priority.

18. Method in accordance with claim 15, wherein the status information for a resource is stored in a volatile and a non-volatile memory, and the status information is updated in both memories.

19. Computer program product stored in the internal memory of a digital computer, containing parts of software code to execute the method in accordance with claim 15 when the product is run on the computer.

* * * * *